United States Patent [19]
Veit

[11] 3,981,302
[45] Sept. 21, 1976

[54] EMERGENCY BREATHING MEANS

[75] Inventor: Herbert F. Veit, Fullerton, Calif.

[73] Assignee: Robertshaw Controls Company, Richmond, Va.

[22] Filed: Feb. 26, 1975

[21] Appl. No.: 553,282

[52] U.S. Cl. .............................. 128/203; 128/142.4; 244/118 P
[51] Int. Cl.[2] ......................................... A62B 7/14
[58] Field of Search ................. 128/203, 142, 142.4, 128/146.3, 140 R, 204; 221/9 R; 222/52; 244/118 P, 152; 312/223; 49/31, 141; 73/4 R, 4 V

[56] References Cited
UNITED STATES PATENTS

| | | | |
|---|---|---|---|
| 2,284,984 | 6/1942 | Nixon et al. | 244/118 P |
| 2,376,348 | 5/1945 | Fox | 128/145.8 |
| 2,403,508 | 7/1946 | Deming | 128/203 |
| 2,934,293 | 4/1960 | Boehm et al. | 244/118 P |
| 3,017,764 | 1/1962 | Gilday | 73/4 R |
| 3,073,301 | 1/1963 | Hay et al. | 128/203 |
| 3,269,170 | 8/1966 | Sebring et al. | 73/4 R |
| 3,607,122 | 9/1971 | Hwoschinsky | 128/203 |
| 3,677,062 | 7/1972 | King et al. | 73/4 R |

FOREIGN PATENTS OR APPLICATIONS

| | | | |
|---|---|---|---|
| 1,214,998 | 4/1960 | France | 128/203 |

Primary Examiner—Robert W. Michell
Assistant Examiner—Henry J. Recla
Attorney, Agent, or Firm—Fulwider, Patton, Rieber, Lee & Utecht

[57] ABSTRACT

There is disclosed an emergency breathing supply system which is suitable for use in cabin-pressured aircraft and which is operative upon failure of the cabin pressure. The emergency breathing supply system includes breathing facilities such as breathing face masks and the like stored within a container for retrieval therefrom, a lid attached to the container and secured thereon by a latch mechanism including a latch trigger that is responsive to a preselected value of ambient pressure to operate the latch and release the lid. The ambient pressure sensing device is preferably an aneroid barometer within a sealed housing having a vent port which is opened to the interior of the cabin. The latch mechanism of the container includes a pressure-responsive, latch triggering subassembly carried on an interior wall of the container and including the sealed housing that contains an aneroid barometer and that supports a hammer brcket; which carries a hammer that is pivotal and spring biased into an advanced position where the hammer displaces the latch plate of the latch mechanism to release the housing lid.

10 Claims, 8 Drawing Figures

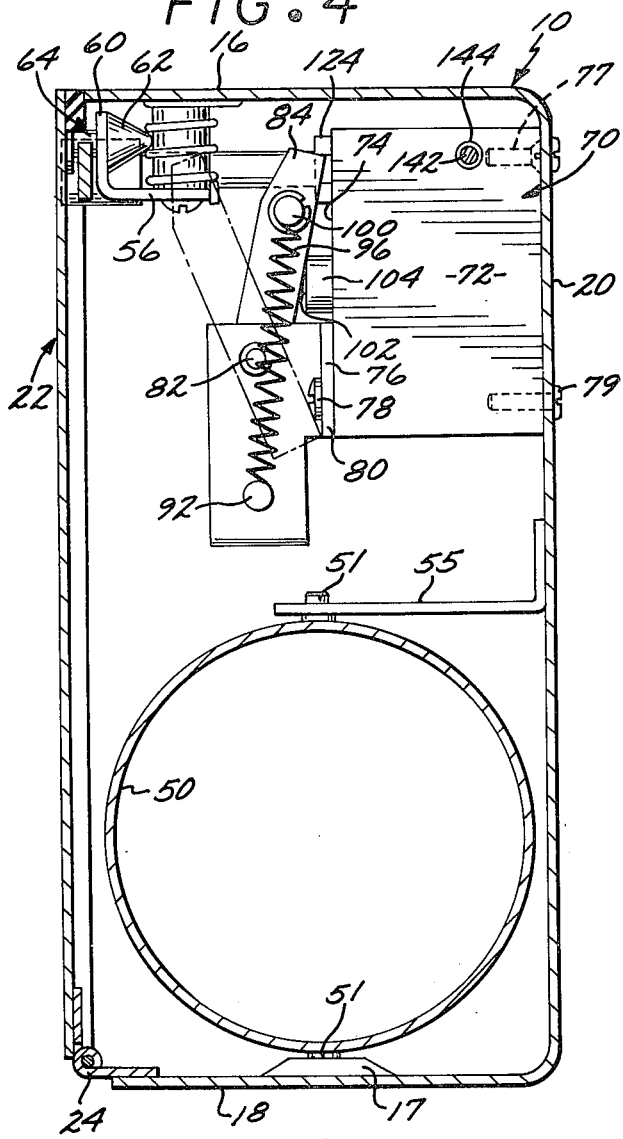
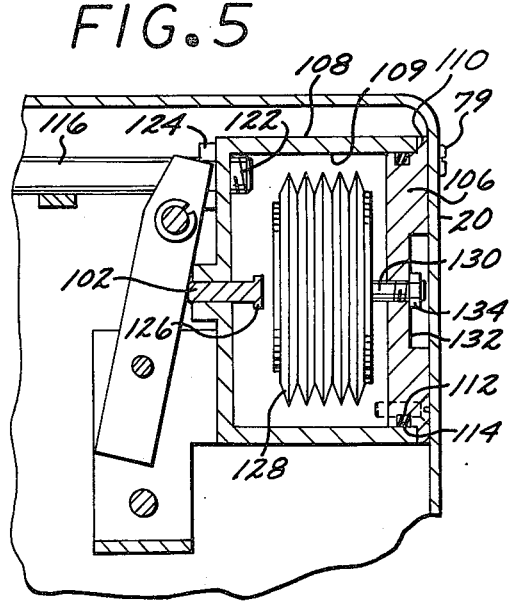
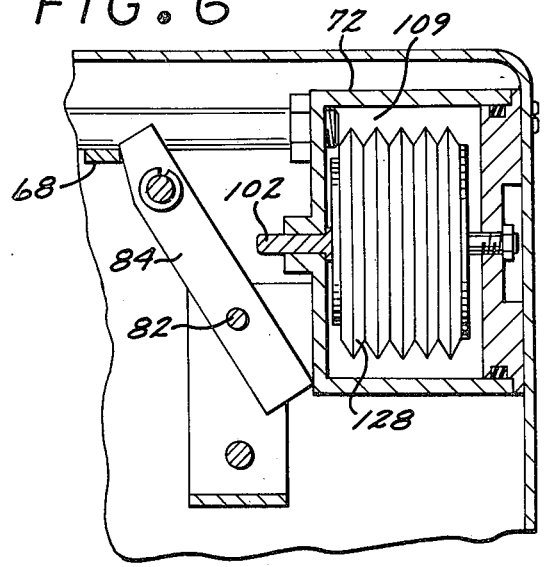
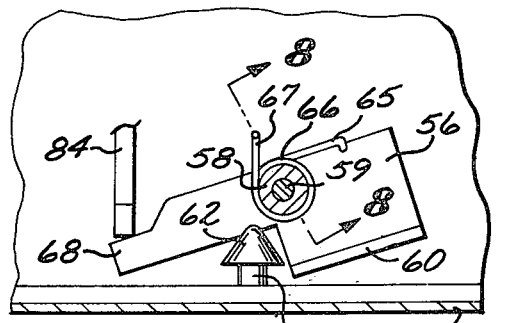
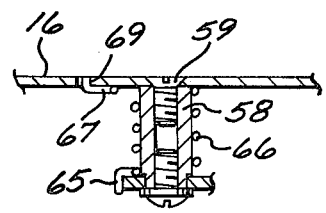

EMERGENCY BREATHING MEANS

BACKGROUND OF THE INVENTION

1. Field of the Invention

This invention relates to emergency breathing apparatus and, in particular, to an emergency system containing breathing masks in a container with ambient pressure sensitive means to automatically open the container at a preselected value of ambient pressure.

2. Brief Description of the Prior Art

Commercial aircraft used for airline service generally have an emergency oxygen supply that is centrally located in the aircraft and individual breathing masks which are connected to the supply of emergency oxygen closeted in the aircraft adjacent the passenger's seats and which are discharged for use by the release of oxygen pressure from the central supply. These systems are quite suitable for airline use but are not idealy suited for business and other aircraft having custom interiors with the passenger seats located at various positions to suit the customer's needs and desires.

A need, therefore, exists for an unitized emergency breathing apparatus that can be installed as a packaged unit within the aircraft. Such a unit should include a self-contained, latch release mechanism responsive to preselected values of ambient pressure whereby the emergency breathing apparatus is automatically released in the event of failure of cabin pressure. Prior latch release mechanisms have lacked a unitized construction whereby malfunctioning components can be readily exchanged. Additionally, prior devices have lacked adequate inspection facilities whereby the latch release mechanism can be tested for proper operation.

BRIEF DESCRIPTION OF THE INVENTION

This invention comprises a unitized emergency breathing supply system which includes emergency breathing means stored within a container for retrieval therefrom, lid means carried by the container with latch means securing the lid in closure of the container and latch triggering means responsive to a preselected value of ambient pressure to operate the latch and release the lid. The latch triggering means includes an ambient pressure sensing means that is contained within a substantially fluid-tight housing having a vent port which is open to the exterior of the container, together with attachment means for the removable and sealed attachment of a source of vacuum of a controlled value to the vent port to permit testing of the triggering means.

The emergency breathing means includes breathing means connected to a source of oxygen which, preferably, is also housed within the container. The latch means securing the lid in closure of the container includes a latch pin carried by the lid and a latch plate means pivotally carried on an interior wall of the container between pin detent and pin release positions with, preferably, spring means biasing the latch plate means into the pin detent position. The latch triggering means which, preferably, is a unitized subassembly for replacable mounting within the container, includes a pressure cell housing with an ambient pressure sensing means such as an aneroid barometer contained within the housing. The housing also carries a hammer bracket which pivotally supports a hammer that is pivotal between retracted and advanced positions. In its advanced position, the hammer urges the latch plate means into its pin release position. The hammer is biased for a snap-over action between its retracted and advanced positions by resilient means such as a pair of tension coil springs biased between the hammer and the bracket. The hammer is linked to the aneroid barometer by a trigger carried by the housing. The trigger is a push rod received in a bore in the housing end wall and projecting into the housing and into the path of expansion of the aneroid barometer, operative to urge the hammer to snap over from its retracted to its advanced position.

BRIEF DESCRIPTION OF THE DRAWINGS

FIG. 4 is a sectional view along lines 4—4 of FIG. 3;

FIGS. 5 and 6 are partial sectional views taken along lines 5—5 of FIG. 3, showing the latch triggering mechanism in its retracted and advanced positions, respectively;

FIG. 7 is a view of the latch mechanism; and

FIG. 8 is a view along lines 8—8 of FIG. 1.

DESCRIPTION OF THE PREFERRED EMBODIMENT

Figure 1:
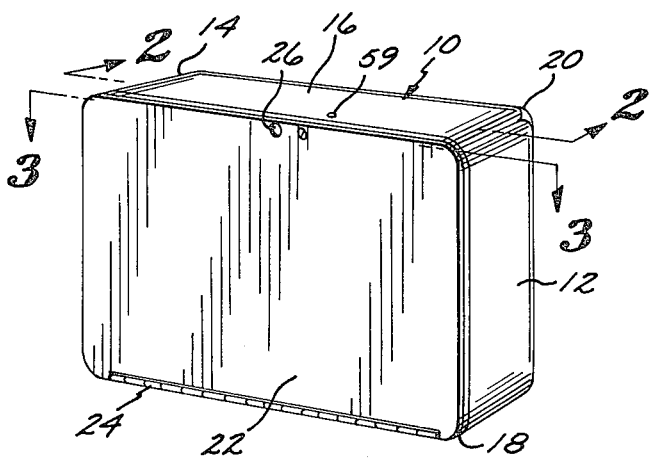
FIG. 1 is a perspective view of the emergency breathing unit of the invention.

Referring now to FIG. 1, the emergency breathing system is illustrated as a unit housed in container 10 which is a generally box-like enclosure with sidewalls 12, 14, 16 and 18, rearwall 20 and a front lid 22 that is pivotally attached thereto by hinge means such as the piano hinge 24. The container 10 bears a port 26 whereby the surrounding pressure is applied to the interior of the container.

Figure 2:
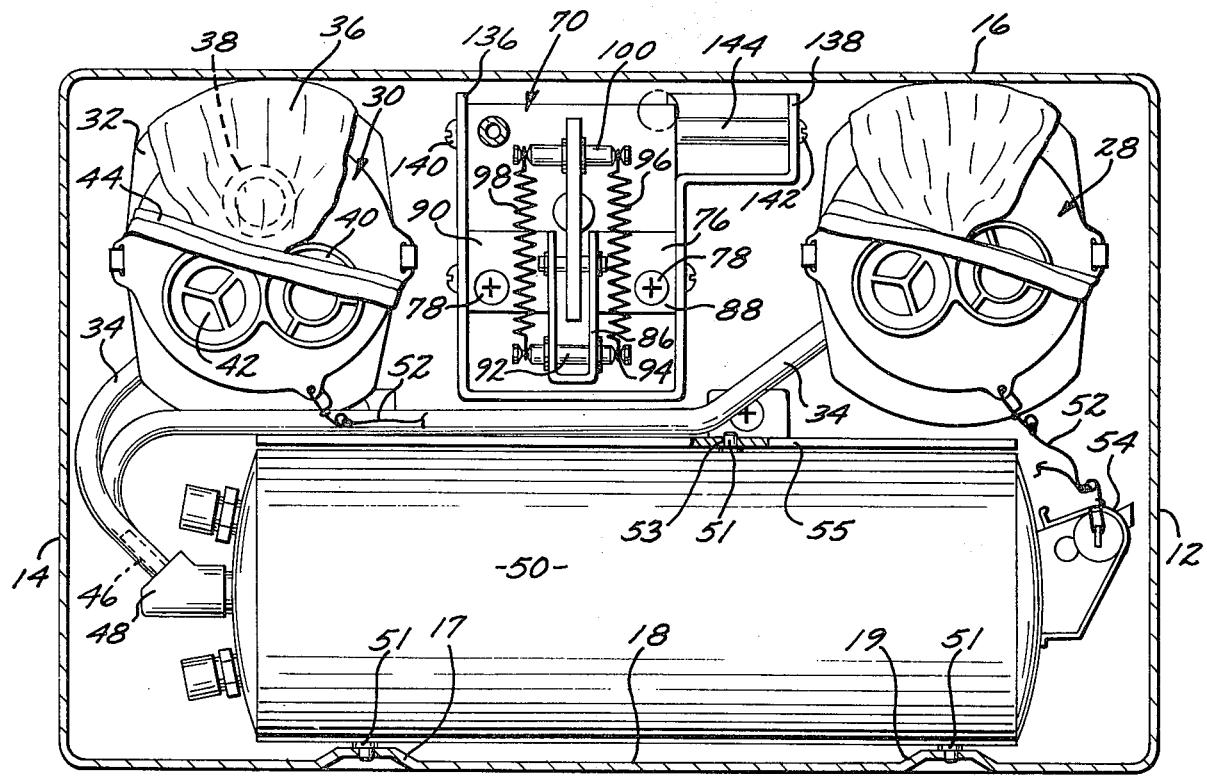
FIG. 2 is a sectional view along lines 2—2 of FIG. 1.

Interiorly of container 10 are disposed the emergency breathing means and a latch mechanism that is responsive to a preselected value of ambient pressure to unlatch lid 22. FIG. 2 illustrates the interior of container 10 as including a plurality of emergency breathing means including face masks 28 and 30, which are conventional and are manufactured and sold by the Sierra Engineering Company, 123 E. Montecito Avenue, Sierra Madre, California and described in U.S. Pat. No. 2,936,779. Briefly, each mask includes a face cup 32 of flexible plastic, an appropriate length of plastic tubing 34 which communicates with a bag 36 of flexible plastic film that, in turn, communicates with a port bearing resilient-flapper check valve 38. The mask also bears a similar check valve 40 for discharge of exhaled air from the mask and a spring-biased check valve 42. The mask bears an elastic textile cord 44 whereby the mask can be secured on a user's face. Plastic tubing 34 is coiled and stored within each face mask and its free end extends into attachment with nozzle 46 carried by fixture 48 that is secured to oxygen supply cylinder 50. Each mask also bears a lanyard 52 which extends to trigger means 54 of the oxygen supply cylinder 50. Lanyards 52 are of sufficient length that when a user grasps the mask and lifts it to his face, the trigger means 54 will be activated, releasing oxygen through fitting 48, nozzles 46 and plastic tubings 34 to the individual masks.

The oxygen supply cylinder 50 is supported in container 10 on offset shoulders 17 and 19 pressed in the bottom wall 18 and bored to receive pins 51 carried on the wall of container 50. A similar pin 51 on the opposite side of container 50 is received in a bore 53 of plate bracket 55 which extends from rear wall 20 of container 10.

The presently preferred embodiment of the invention employs a chemical supply of oxygen within cylinder 50, typically a cylinder containing sodium perchlorate having a powdered iron igniter such as that manufactured and marketed by Scott Aviation, 225 Erie Street, Lancaster, New York under the designation of Aviox Oxygen Generator. Typical of such units is a cylinder approximately 7½ inches in length and 2¾ inches in diameter that is adequate to provide two persons with an oxygen supply of approximately 15 minutes.

Other sources of supply of oxygen can be provided such as a pressured container of oxygen or, if desired, the masks of the unit can be connected to a central oxygen supply with the lanyards 52 being connected to a valve mechanism in a conduit communicating with the central supply whereby the oxygen from the central supply can be released into the individual face masks.

Figure 3:
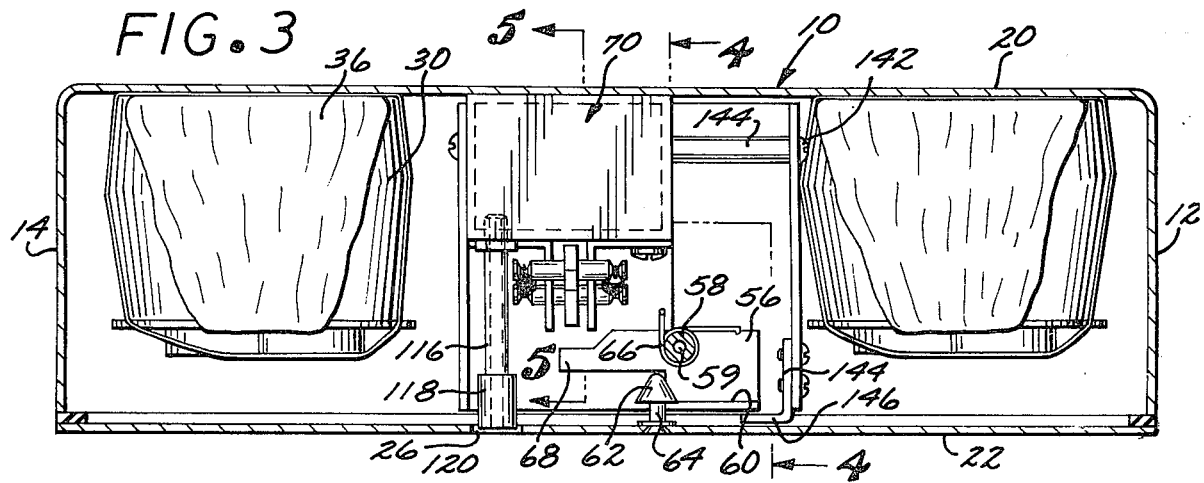
FIG. 3 is a sectional view along lines 3—3 of FIG. 1.

Referring now to FIG. 3, the lid 22 of container 10 is secured in closure of container 10 by a latch mechanism which includes latch plate 56 which is pivotally mounted on pin 58 which is secured to wall 16 of the container 10 by a screw fastener 59; see FIGS. 1 and 8. Latch plate 56 bears flange 60 which is operative to secure the undersurface of conically bulbous end 62 of latch pin 64. Preferably, latch plate 56 is biased into its pin detent position, illustrated in FIG. 3, by spring means such as torsion spring 66 having one leg thereof secured to the wall of container 10 and the other leg biased against an edge of plate 56.

The container also bears a pressure responsive latch triggering subassembly generally indicated at 70 in FIGS. 2 and 3 and illustrated in particular detail in FIGS. 4–6.

Referring now to FIG. 4, the container 10 is illustrated in a sectional view with lid 22 secured in closure of container 10 and with latch plate 56 in its detent position with its flange 60 engaging the undersurface of bulbus end 62 of pin 64. The latch triggering mechanism generally indicated at 70 includes a pressure cell housing 72 which contains an ambient pressure sensing means and which supports, on its inboard face 74, hammer bracket means 76 secured thereto by machine screws 78 which extend through bores in flange 80 of hammer bracket means 76 and into engagement with threaded bores in housing 72. The hammer bracket means supports, on pin 82, hammer means 84 which is pivotal between a retracted position indicated in the solid lines of FIG. 4, and an advanced position indicated by the broken lines where it engages against an arm extension 68 of latch plate 56.

Referring now to FIG. 2, the hammer means and hammer bracket means can be seen in greater detail. As there illustrated, bracket means 76 is generally U-shaped and bears a central yoke 86 from opposite side flanges 88 and 90. The bracket also supports spring retainer means in the form of pin 92 which projects outwardly from each side of the yoke 86 and which is grooved at 94 on each end to provide retention of one end of each of parallel springs 96 and 98. The springs 96 and 98 extend to similar retainer pin means 100 carried on the hammer end of hammer means 84.

As illustrated in FIG. 4, the springs 96 and 98 are operative to impart a snap-over action to hammer means 84 whereby the hammer means is biased into its retracted position, shown in solid lines, or its advanced position, shown in broken lines. In its retracted position, hammer means 84 rests against trigger means in the form of push rod 102 which is slidably received in a bore within cylindrical boss 104 centrally that is located on the inboard face 74 of housing 72.

Referring now to FIG. 5, the pressure cell housing 72 is illustrated as formed by base plate 106 and a generally rectangular block 108 having a cylindrical cavity 109 which fits about an annular shoulder 110 of plate 106. Shoulder 110 is grooved at 112 to receive seal means in the form of an O-ring 114 whereby the assembly of block 108 and base plate 106 is sealed to the environment. The assembly of the base plate 106 and block 108 is secured by flat head screw fasteners 77 which are received in countersunk bores at two diagonally opposite corners of the assembly and by screws 79 at the other corners which also extend through bores in the rear wall 20 of container 10 and thereby serve to support the triggering mechanism in the container. The interior cavity 109 is vented through tube 116 that extends to the port 26 in the container lid 22 as illustrated in FIG. 3. Tube 116 bears, on its distal end from housing 72, fitting 118 which is counter-bored at 120 to provide attachment means to receive the end of a probe connected to a source of controlled fluid pressure whereby the controlled pressure can be applied to the interior of housing 72 from a source exterior of the container 10. Tube 116 is secured to housing 72 by conventional means, e.g., tube 116 can bear a threaded end 122 which is turned into a threaded bore on the inboard face 74 of housing 72 and locked thereto by lock nut 124.

As previously mentioned, the push rod 102 extends through a bore carried in boss 104 centrally of face 74 of housing 72. The rod 102 terminates within housing 72 with head 126 for retaining the pin within the housing. The pin projects into the expansion path of the pressure sensitive means which, preferably, is an aneroid bellows-type barometer 128 that is contained within cavity 109 of housing 72. The barometer is secured therein housing 72 by threaded shaft 130 which extends into a circular recess 132 on the outer face of housing 72. A conventional fastener such as nut 134 is threadably engaged on shaft 130 to support the aneroid barometer in the housing.

Referring now to FIG. 6, there is illustrated the latch triggering mechanism with the hammer 84 in its advanced position as results from the application of ambient pressure interiorly of housing 72 of the predetermined low value necessary to cause the triggering action. As there illustrated, the aneroid barometer 128 has expanded within cavity 109 of housing 72, forcing rod 102 into its triggering position by pivoting hammer means 84 about pin 82 sufficiently to cause the hammer means 84 to snap over its center position, impacting against lever arm 68 of latch plate 56 whereby this latch plate is pivoted out of its pin detent position and into the pin release position shown in FIG. 7.

As illustrated in FIG. 7, hammer means 84 bears against lever arm 68 of plate 56 and rotates latch plate 56 against the bias of spring 66 sufficiently to swing flange 60 from its detent position behind the conically bulbous end 62 of pin 64 whereby this pin and its associated lid 22 are released for opening of container 10.

As shown in FIG. 8, spring 66 bears an arm 67 which is secured against rotation in an aperture 69 in the upper wall 16 of chamber 10 and extends helically about pin 58. The pin 58 is secured to wall 16 by countersunk screw 59 and pivotally supports latch plate 56.

The spring 66 is biased against latch plate 56 with its arm 65 overlying an edge of plate 56.

The entire latch triggering mechanism 70 is preferably employed as a preassembly with the housing 72 supporting the hammer means on the hammer bracket means carried on the inboard face 74 of the housing. The entire mechanism is surrounded by guard plate 136 illustrated in FIGS. 2 and 3. The guard plate is generally U-shaped with one of its sides of housing 72 by screw fasteners such as 140 and 142, the latter extending through sleeve 144 from the offset flange portion 138. The offset flange portion bears bracket 144 shown in FIG. 3, which has a leg 146 that extends to the outside of latch plate 56 and serves as a retainer to prevent latch plate 56 from pivoting, under the bias of spring 66, exteriorly of the enclosure 10.

The invention has been described with reference to the presently preferred and illustrated embodiment thereof. It is not intended that the invention be unduly limited by this disclosure of preferred embodiment. Instead, it is intended that the invention be defined by the means and their obvious equivalents set forth in the following claims.

What is claimed is:

1. A unitized emergency breathing supply system comprising:
   a container;
   emergency breathing means stored in said container for retrieval therefrom;
   lid means attached thereto;
   latch means consisting of means entirely within said container locking said lid means in closure of said container;
   latch triggering means within said container responsive to a preselected value of ambient pressure to operate said latch means and release said lid including ambient pressure-sensitive means in an enclosed housing having a single vent port; and
   test probe attachment means on the exterior of said container, conduit means communicating said test probe attachment means to said vent port for the sealed application of a source of controlled fluid pressure to said housing to permit testing of the preselected value of pressure of said latch triggering means.

2. The emergency breathing supply system of claim 1 wherein said emergency breathing means includes breathing mask means.

3. The emergency breathing supply system of claim 2 including, within said container, a source of oxygen, oxygen release means to release oxygen therefrom and duct means extending therefrom to said breathing mask means.

4. The breathing means supply assembly of claim 3 wherein said source of oxygen is a chemical oxygen generator including lanyard means extending between said breathing mask means and said oxygen release trigger means.

5. The breathing means supply assembly of claim 2 wherein said breathing mask means includes a plurality of individual breathing face masks.

6. The emergency breathing supply system of claim 1 including:
   hammer bracket means mounted on said housing;
   hammer means pivotally mounted on said hammer bracket means for movement between retracted and advanced positions;
   hammer resilient means biased between said hammer means and said hammer bracket to impart to said hammer a snap-over action between said retracted and advanced positions;
   trigger means slidably mounted on said housing and responsive to said pressure sensing means to urge said hammer from its retracted position whereby said hammer snaps over to its advanced position; and
   attachment means to secure said housing to an interior surface of said container with said hammer in its forward position biasing the lid latch means of said container into a lid releasing position.

7. The supply system of claim 6 wherein said pressure responsive means is an aneroid barometer having an expansion-contraction path responsive to ambient pressure.

8. The supply system of claim 7 wherein aneroid barometer is a sealed container with bellows sidewalls.

9. The supply system of claim 7 wherein said trigger is a push rod slidably carried in a wall of said housing and projecting into the path of expansion of said aneroid barometer.

10. The supply system of claim 6 wherein said hammer is a plate bearing spring retainers on opposite sides thereof and said resilient means comprises a pair of tension springs, one each disposed on opposite sides of said plate between said hammer spring retainers and like retainers carried on said hammer bracket.

* * * * *